(12) United States Patent
Pike

(10) Patent No.: US 8,052,326 B2
(45) Date of Patent: Nov. 8, 2011

(54) LINEAR BEARING

(75) Inventor: Anthony Bruce Pike, Upper Norwood (GB)

(73) Assignee: APA Parafricta, Ltd., Buckinghamshire (GB)

( * ) Notice: Subject to any disclaimer, the term of this patent is extended or adjusted under 35 U.S.C. 154(b) by 1233 days.

(21) Appl. No.: 10/531,619

(22) PCT Filed: Oct. 14, 2003

(86) PCT No.: PCT/GB03/04470
§ 371 (c)(1),
(2), (4) Date: Nov. 14, 2005

(87) PCT Pub. No.: WO2004/036067
PCT Pub. Date: Apr. 29, 2004

(65) Prior Publication Data
US 2006/0120638 A1    Jun. 8, 2006

(30) Foreign Application Priority Data
Oct. 14, 2002   (GB) .................................... 0223707.1

(51) Int. Cl.
*F16C 29/00* (2006.01)
*F16C 19/20* (2006.01)
(52) U.S. Cl. .................. 384/49; 193/35 MD; 193/37
(58) Field of Classification Search .............. 384/48, 384/49; 16/26; 193/35 MD, 37
See application file for complete search history.

(56) References Cited

U.S. PATENT DOCUMENTS

| | | | |
|---|---|---|---|
| 2,192,821 A | 3/1940 | Torines | |
| 2,988,084 A | 6/1961 | Doulgas | |
| 3,978,531 A | 9/1976 | Bengt | |
| 4,169,466 A | 10/1979 | Wong | |
| 4,297,913 A * | 11/1981 | Garbo | 74/502.3 |
| 4,860,875 A | 8/1989 | Couwenbergs | |
| 5,074,678 A * | 12/1991 | Eberle | 384/49 |
| 5,464,086 A * | 11/1995 | Coelln | 193/35 SS |
| 5,657,956 A | 8/1997 | Smith et al. | |
| 5,863,132 A * | 1/1999 | Smith et al. | 384/49 |

FOREIGN PATENT DOCUMENTS

| | | | |
|---|---|---|---|
| CH | 132 093 A | | 3/1929 |
| DE | 103 46 133 | * | 4/2004 |
| EP | 0 843 991 | | 5/1998 |
| FR | 1 564 475 A | | 4/1969 |
| GB | 543 524 A | | 3/1942 |

* cited by examiner

*Primary Examiner* — William C Joyce
(74) *Attorney, Agent, or Firm* — Calfee, Halter & Griswold LLP

(57) ABSTRACT

A bearing (1) having a frame (2), the frame at least partly surrounding two matrices (12, 16), each of a plurality of spheres (10) which are mounted for rotation so that the spheres in each matrix when the matrix is flat lie in a substantially single plane, the plane of one matrix being parallel to that of the other, the spheres of one matrix are so located that they mostly lie against the spheres on the other matrices so that rotation of the spheres of one matrix results in counter-rotation of spheres of the other matrix; the bearing formed in such a way enables the beating to be pushed or pulled under an object such as a patient lying on the ground with little or no movement transmitted to the object/patient as the bearing moves between the object and an underlying surface. The bearing can also be used for massaging a patient who is unable to move his or her body or for bearings with civil engineering applications.

13 Claims, 6 Drawing Sheets

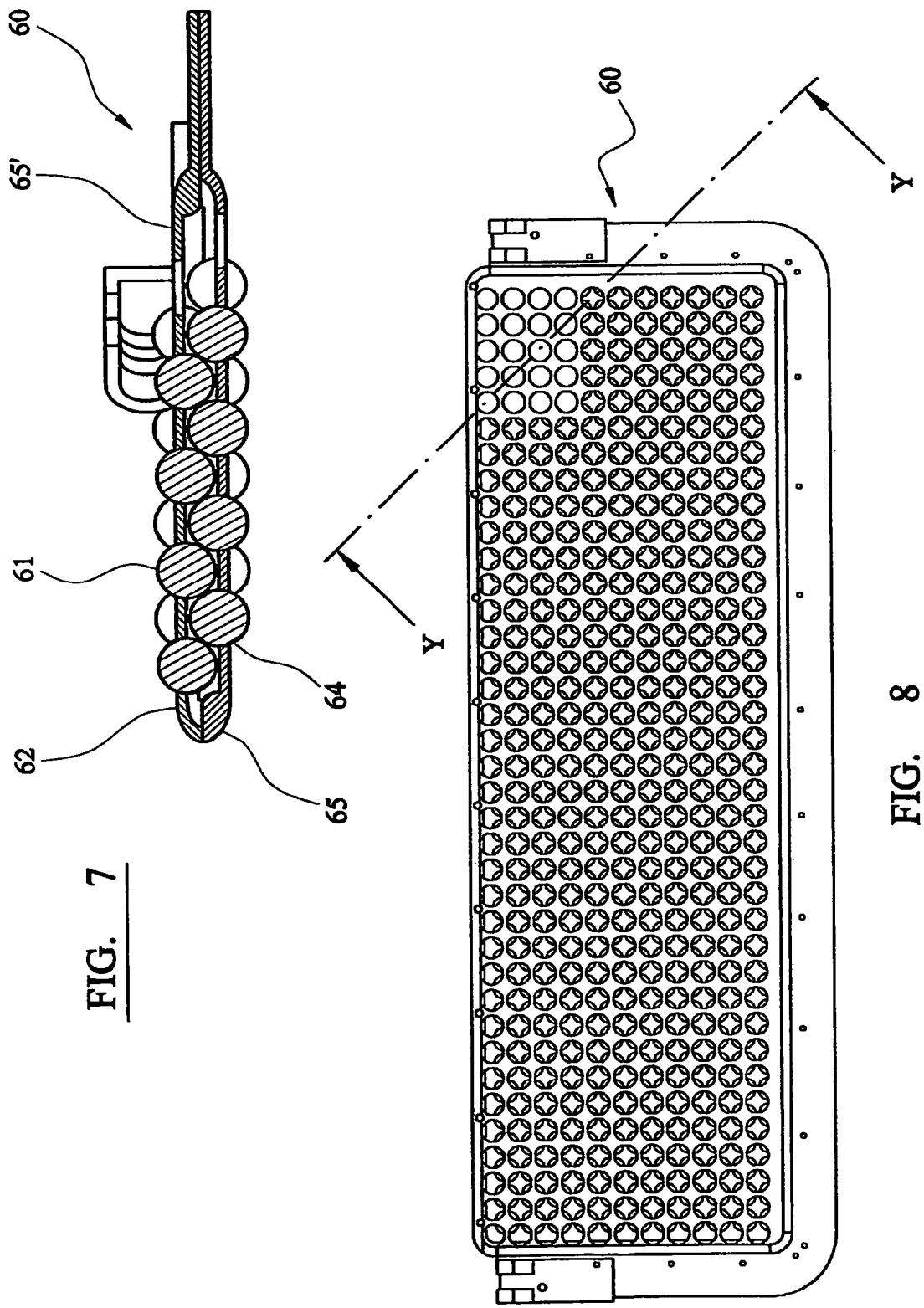

LINEAR BEARING

CROSS REFERENCE TO RELATED APPLICATIONS

The present application is the U.S. national phase entry of PCT/GB2003/004470 with an international filing date of Oct. 14, 2003 and claims priority from GB Patent Application Serial No. 0223707.1, filed Oct. 14, 2002 and issued as GB Patent No. 2394423 on Sep. 22, 2004.

FIELD OF THE INVENTION

The present invention relates to linear bearings.

BACKGROUND OF THE INVENTION

Linear bearings are used for a number of purposes, for instance ball conveyors as shown in GB Patent No 543,524 (Curran) and GB Patent No 1,263,456 (NRDC). The principle 8 of ball conveyors has been used for moving loads such as boxes or work pieces and also for patients in a hospital.

The present invention is also designed in different forms to cope with the problem of moving objects of the same width as above including heavy structures like bridge components as well as for handling patients.

Rescue stretchers are either rigid or flexible and are normally placed to one side of a patient who is then lifted or rolled (termed "log rolled") on to the stretcher. Both methods of placing the patient on the stretcher are dangerous since spinal injuries can be aggravated by the action of lifting or rolling. In order to prevent further injury where spinal injury has already occurred, it is clearly necessary if possible, to move the patient onto a stretcher without disturbing the patient, particularly moving the patient's head relative to the rest of the patient's body.

SUMMARY OF THE INVENTION

A linear bearing according to the present invention comprising a frame, at least partly surrounding two matrices, each of a plurality of spheres, the spheres of one matrix located so as to lie at least mostly against the spheres of the other matrices so that rotation of spheres of one matrix results in counter-rotation of spheres of the other matrix, characterized in that the spheres of each matrix project beyond the frame and are constrained to be retained in the same relative positions with respect to the frame during the counter-rotation.

The juxtaposition of the spheres enables the bearing to be pushed or pulled under a patient lying on the ground after an accident with the lower surface of the lower matrix spheres acting on the ground and the upper surface of the upper matrix spheres acting on the patient. Rotation of the lower spheres in one direction causes the upper spheres to rotate in the opposite direction. The result is that little or no movement is transmitted to the patient as the bearing moves under the patient.

In an alternative use for the bearing, it can be slid under a patient on a bed and the patient lifted to change a sheet. Also the bearing can be slid under a patient subject to bed sores and moved to and fro to massage the patient. This is particularly advantageous where the patient is unable to move his or her body.

The matrices should be arranged to hold the spheres of each matrix separate from each other but sufficiently close that the spheres of the lower matrix support the spheres of the upper matrix. The spheres are preferably arranged to be held in each matrix by means of a sheet of material having holes of a diameter smaller than that of the spheres so that each hole locates each sphere in the correct geometrical position in the matrix. Preferably the perimeter of the pair of matrices is defined by a frame to which the material holding the spheres may be fixed. The frame may have loops or toggles so that the bearing can be grasped or hooked onto for maneuvering.

In one embodiment the bearing of the invention has means for attachment to an inflatable secondary bearing. The secondary bearing may have detachable poles to enable it to be carried as a stretcher.

In a further embodiment the bearing of the invention may itself have suitable means to enable it to be carried as a stretcher, straps being provided to hold the patient on the bearing.

Because the present invention provides an excellent solution to the reduction of frictional forces between two bodies which are required to be or inevitably will move relative to each other, the invention may be applied to both rectilinear and curvilinear including sphericolinear situations where the bodies which require to move relative to each other can be enabled to move either two or three dimensionally relative to each other. Take, for example, in tidal waters, where a ship is moored alongside a jetty, a gangway is provided to access the ship from the jetty. In such a case, the ship moves relatively to the jetty up and down and to an extent along the jetty and slightly towards or away from the jetty. In such a case, it is conventional to secure the gangway to the ship in such a way that the inboard end can move in a vertical plane and slightly pivot in the horizontal plane whilst the outboard or jetty end can move both in a vertical plane and move in the horizontal plane. Such movement which is allowed for is however subject to restraint by inboard tackles and needs to be watched by gangway staff. A similar problem arises when accessing pontoons.

In another example, offshore oil production platforms are connected to accommodation platforms by bridges. In some conditions, there is relative movement between platforms at least at the height where the bridges are required. It is therefore important to allow for such relative movement. Otherwise the bridge will not stand the relative forces involved.

In a further example, large structures such as bridges need to be able to move slightly and within limits relative to the bridge supports. In some cases, this is normally enabled by providing elastomeric bearings. However, these do not always last long and although individually relatively cheap are very expensive to replace.

A still further example for use of the invention is where there is thermal expansion between large structures which if not allowed for would cause unacceptable stress between the structures such that one or both structures could eventually fail.

BRIEF DESCRIPTION OF THE DRAWINGS

An embodiment of the invention will now be described with reference to the accompanying drawings, in which:

FIG. 7 is a cross section of a bearing in the form of a platform taken on Y-Y of FIG. 8, according to the invention;

FIG. 8 is a plan view of the further embodiment of FIG. 7; and

DETAILED DESCRIPTION OF THE INVENTION

Figure 1:
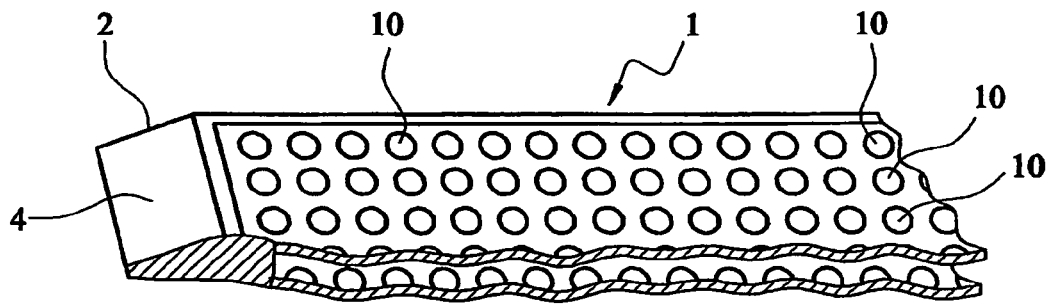
FIG. 1 is a perspective view of a part of a bearing according to one embodiment of the present invention.
Figure 2:
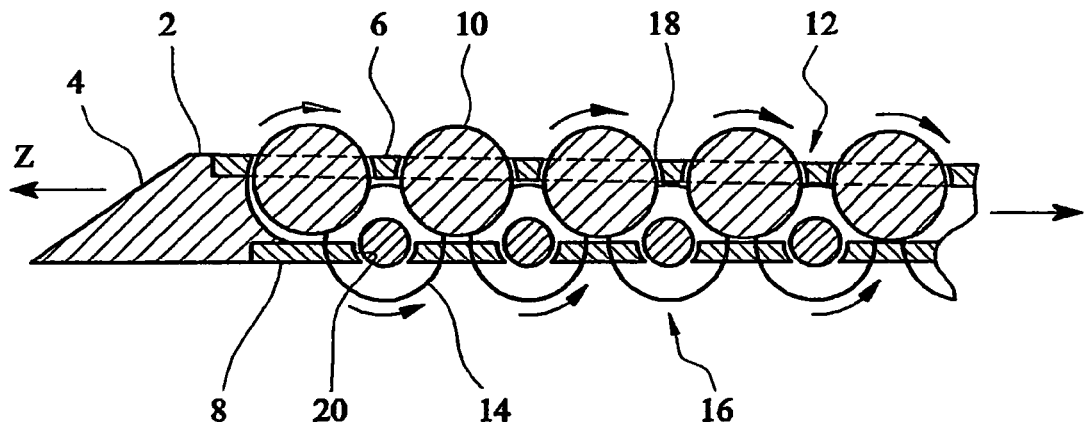
FIG. 2 is a vertical cross section of the bearing of FIG. 1 taken at A-A.
Figure 3:
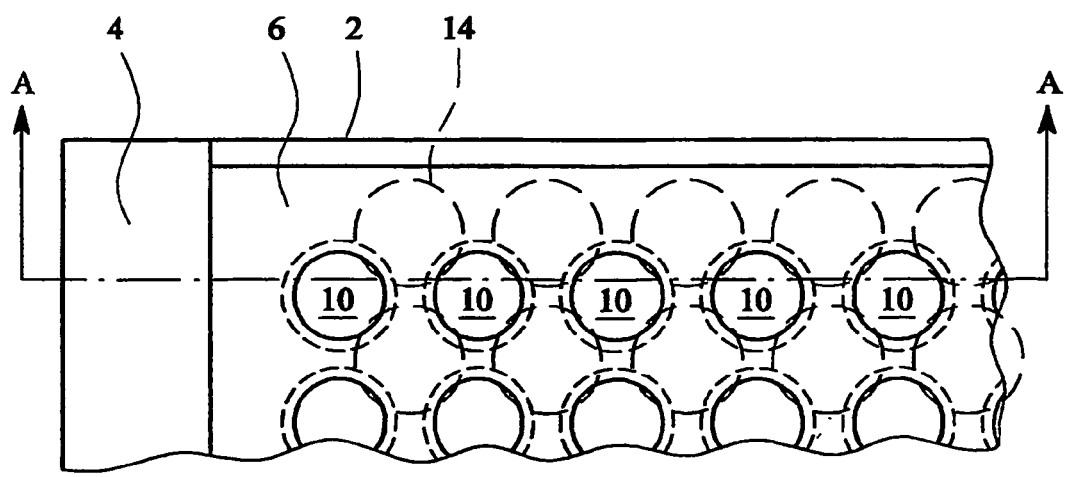
FIG. 3 is a plan view of part of the bearing of FIG. 1.

The bearing in the form of a mat of FIG. 1 is formed with a frame 2 made of a flexible plastics material having a chamfered edge 4 and supporting an upper perforated sheet 6 and a lower perforated sheet 8. The upper perforated sheet locates a plurality of spheres 10 and together they form a first matrix 12. The lower perforated sheet 8 locates rows of spheres 14 which form a second matrix 16. The upper rows of spheres 10 of the first matrix seat on the lower spheres of the second matrix in such a way that most of the upper spheres each are supported on four lower spheres.

The upper spheres 10 located in perforations 18 of sheet 6 are such as to allow free rotation of spheres 10. Similarly, perforations 20 in lower sheet 8 allow free rotation of spheres 14. Since the upper spheres are seated on the lower spheres, any rotation of the lower spheres will cause counter rotation of the upper spheres. In this way, any movement of bearing 1 when placed on the ground will cause the upper spheres to move in the opposite direction to the bearing.

The spheres 10 and 14 are preferably made of hard plastics material about 20 mm in diameter and should be substantially inflexible whilst the sheets 6 and 8 require to be sufficiently rigid to maintain the spheres in their correct location but at the same time to have a certain degree of flexibility to allow for the bearing to move over an uneven surface.

Figure 4:
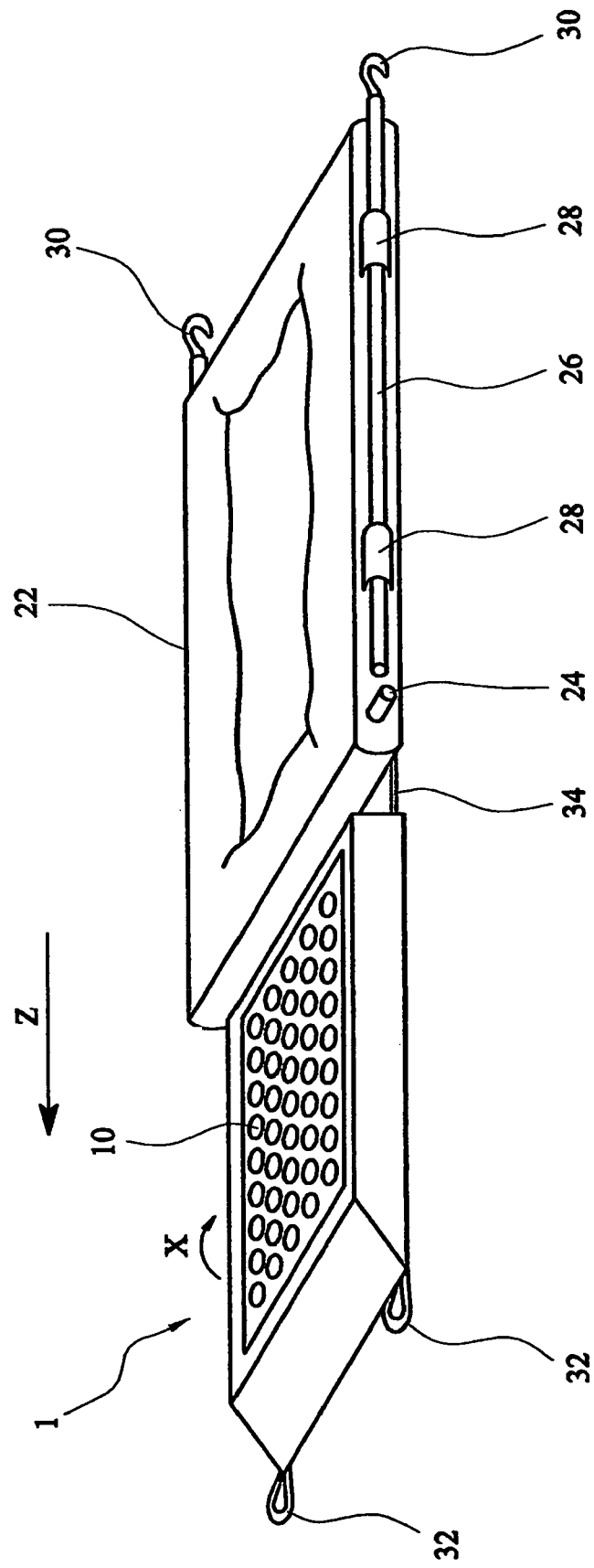
FIG. 4 is a perspective view of the bearing of FIG. 1 attached to an inflatable stretcher.

In FIG. 4, the bearing 1 is attached detachably to an inflatable platform 22 which is kept rigid only by inflation through nozzle 24 and by carrying handles 26 inserted in sleeves 28 on either side of the platform. The attachment of bearing 1 to platform 22 may be by any suitable means such as buttons or by hook and loop material like Velcro (Registered Trademark).

Figure 5:
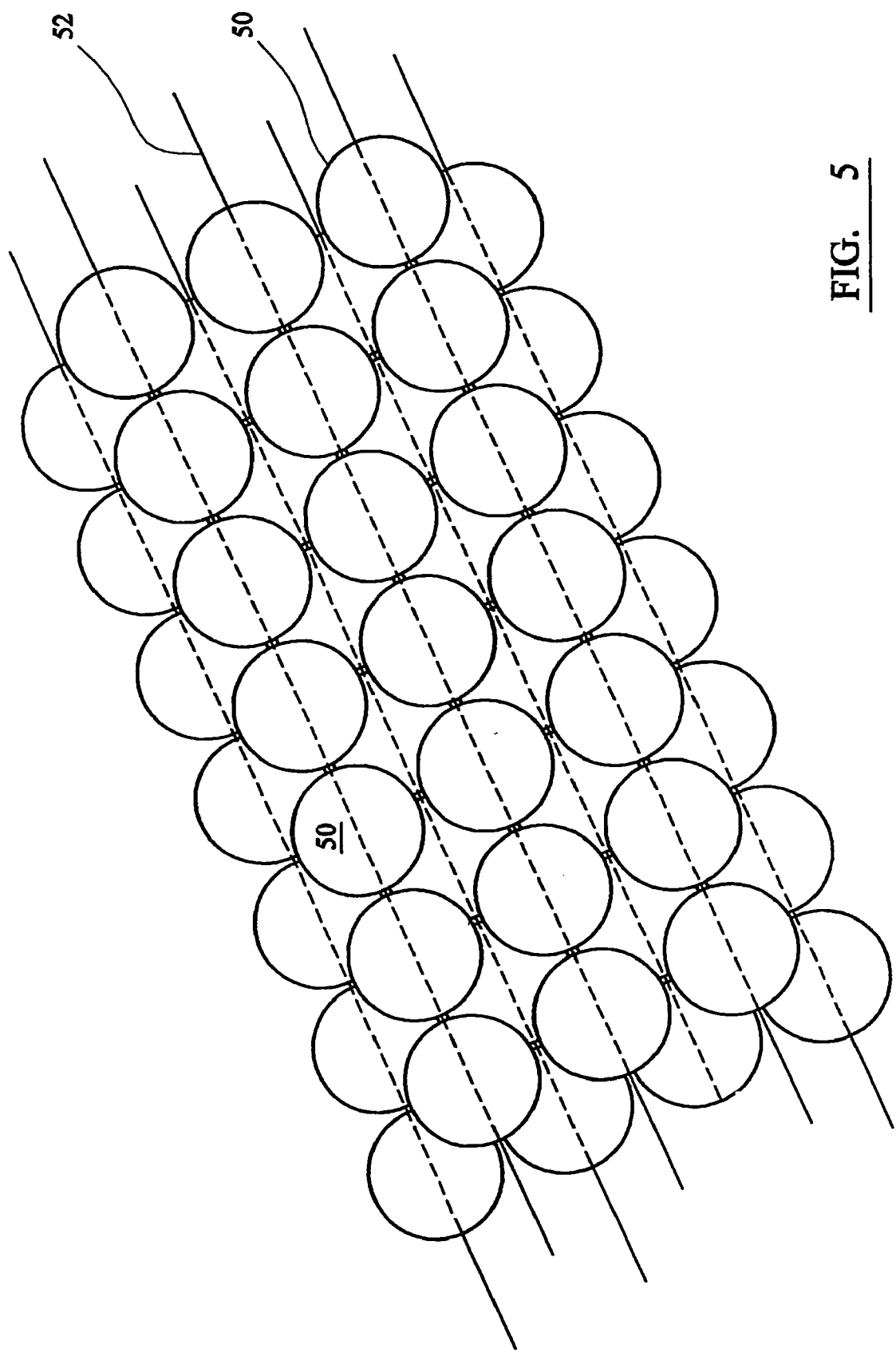
FIG. 5 is a plan view of a second embodiment where spheres are threaded into an upper and lower matrix.
Figure 6:
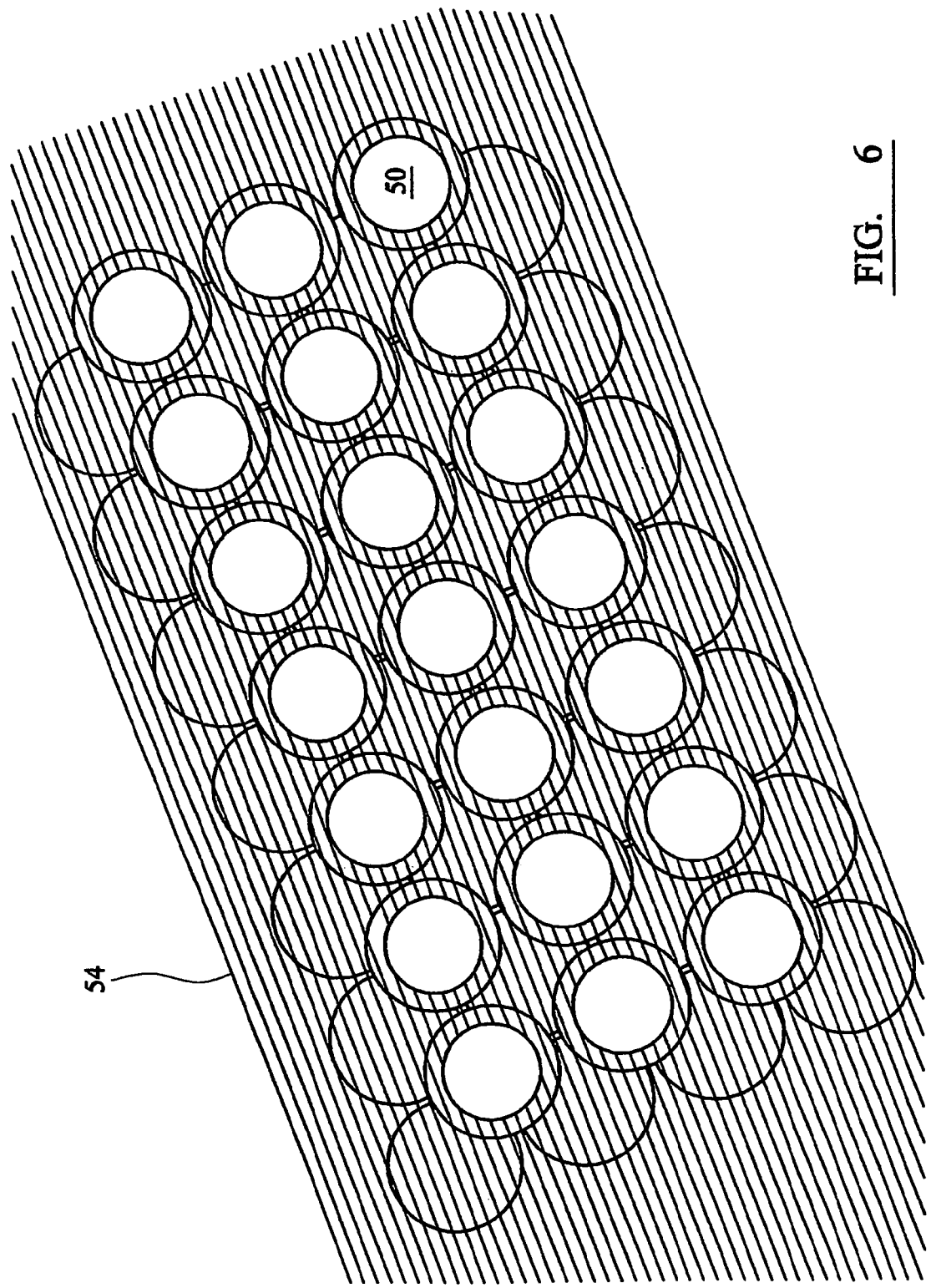
FIG. 6 is a plan view of the second embodiment showing the spheres woven in the matrices.

In order to move a patient from an accident site, the bearing 1 is placed at the foot end of the patient with the chamfered slope 4 towards the patient. The rods 26 with hooks 30 at their ends are then hooked on to loops 32. The platform 22 is attached to the bearing at an attachment 34 and the bearing is, then pulled by the rescuers under the patient in direction Z. Because the upper spheres 10 on the bearing rotate with ground movement in direction X, which is contrary to movement of bearing Z, the patient is not moved relative to the ground in the horizontal direction although of course there will be slight lifting of the patient in the vertical direction. The platform 22 is made of a suitably smooth material so that as the patient moves over the bearing and beyond the bearing, the patient will be gradually moved on to platform 22. Poles 26 are then inserted in sleeves 28; the bearing is detached from the platform and the patient is then stretchered away. The spheres when laid under the patient act to massage the patient who if able to move can be assisted in this movement by the bearing. In an alternative use, the bearing without platform 22 can be laid on to a bed, the bearing being of such a size as to cover perhaps half or quarter of a bed and either used to transfer a patient from a stretcher on to the bed or else pulled under the patient so that the patient can be lifted off the bed for changing sheets. For this purpose the spheres 50 (see FIGS. 5 and 6) are about 5 mm in diameter or less. The bearing for this embodiment is formed by threading the spheres on sacrificial thread 52 and weaving the threaded spheres into a matrix, then dissolving the sacrificial thread to leave the spheres rotatably supported by the weave 54 of the woven matrix.

Figure 9:
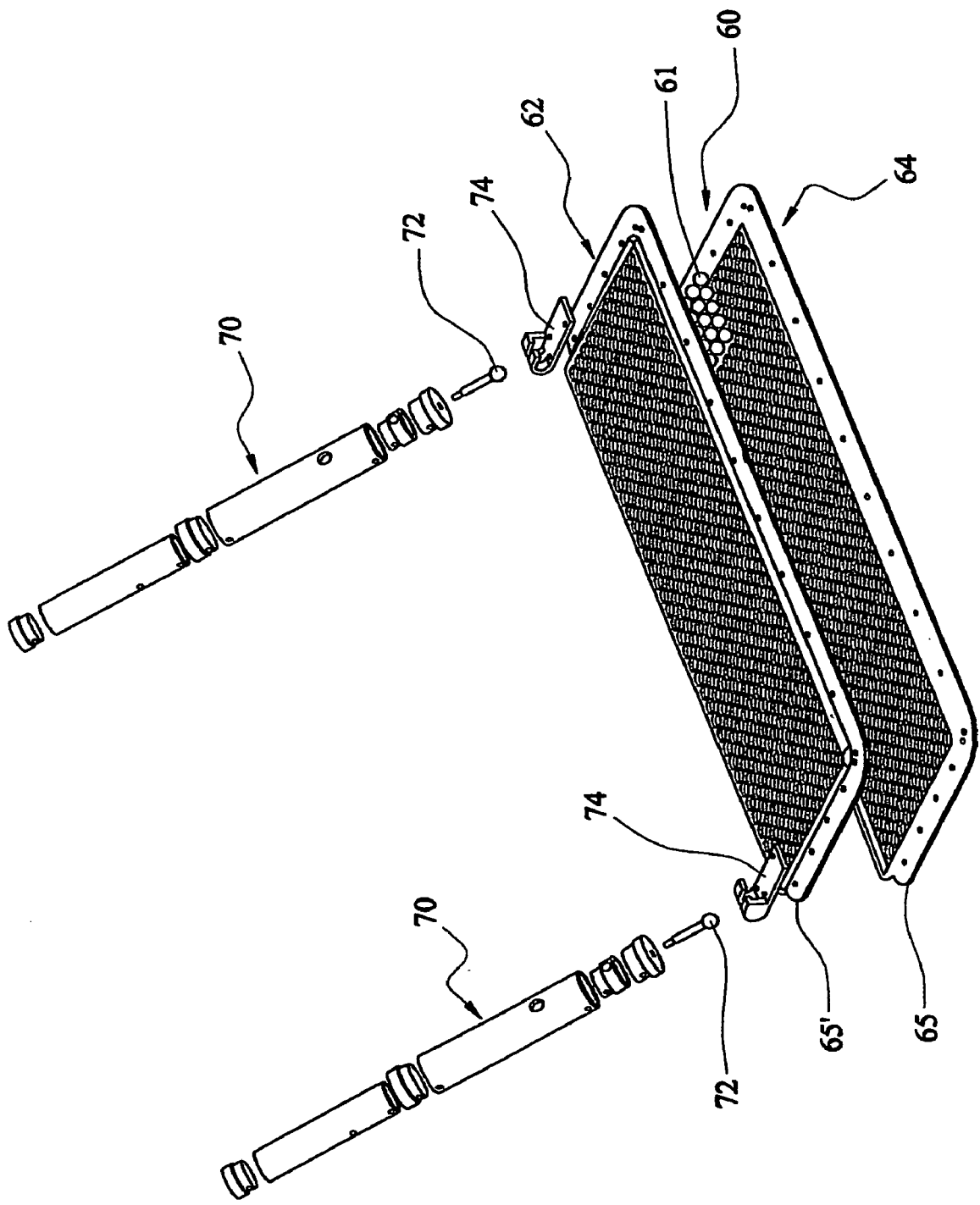
FIG. 9 is an exploded perspective view of the platform of FIG. 8.

FIGS. 7, 8 and 9 show a substantially rigid composite plate 60 incorporating the bearing of the invention in which a first matrix 62 of spheres 61 is located above a second matrix 64. Each matrix is carried in a perforated sub plate 65, 65' which are secured together as shown in FIG. 7.

In FIG. 9 there can be seen telescopic arms 70 which attach by means of ball joints 72 and brackets 74 to the top sub plate 65'. These arms are designed to push the plate 60 under an article, in particular an injured person, so that the person is not subject to injurious movement whilst being transferred from one location (e.g. an accident site) to another (e.g. an, ambulance). Carrying handles (not shown) can be provided on the plate.

The invention claimed is:

1. A bearing comprising a frame at least partly surrounding two matrices each of a plurality of spheres, each matrix when flat having its spheres mounted for rotation in at least part a single plane, the plane of one matrix being parallel to that of the other matrix, each sphere of one matrix located so as to lie in contact with a plurality of spheres of the other matrix so that rotation of spheres of one matrix results in counter rotation of spheres of the other matrix, and a majority of the spheres of one matrix are in contact with four spheres of the other matrix, wherein the spheres of each matrix project beyond the frame and are retained in the same position relative to the frame during rotation.

2. A bearing according to claim 1 wherein the spheres are between 25 mm and 15 mm in diameter.

3. A bearing according to claim 1 wherein the spheres are between 2.5 and 7.5 mm in diameter.

4. A bearing comprising a frame at least partly surrounding two matrices each of a plurality of spheres, and an inflatable platform arranged to be detachably joined to the bearing, each matrix when flat having its spheres mounted for rotation in at least part a single plane, the plane of one matrix being parallel to that of the other matrix, the spheres of one matrix located so as to lie at least in part against the spheres of the other matrix so that rotation of spheres of one matrix results in counter rotation of spheres of the other matrix, wherein the spheres of each matrix are retained in the same position relative to the frame during rotation.

5. A bearing according to claim 4 wherein the inflatable platform is provided with detachable poles disposable on either side of the platform and so arranged for carrying the platform.

6. A bearing comprising a frame at least partly surrounding two matrices each of a plurality of spheres, each matrix when flat having its spheres mounted for rotation in at least part a single plane, the plane of one matrix being parallel to that of the other matrix, the spheres of one matrix located so as to lie at least in part against the spheres of the other matrix so that rotation of spheres of one matrix results in counter rotation of spheres of the other matrix, wherein the spheres of each matrix are retained in the same position relative to the frame during rotation, further wherein the spheres are woven into each matrix.

7. A bearing comprising a frame at least partly surrounding two matrices each of a plurality of spheres, each matrix when flat having its spheres mounted for rotation in at least part a single plane, the plane of one matrix being parallel to that of the other matrix, the spheres of one matrix located so as to lie at least in part against the spheres of the other matrix so that rotation of spheres of one matrix results in counter rotation of spheres of the other matrix, wherein the spheres are woven into each matrix.

8. A bearing according to claim 7 wherein the spheres are between 25 mm and 15 mm in diameter.

9. A bearing according to claim 7 wherein the spheres are between 2.5 and 7.5 mm in diameter.

10. A bearing comprising a frame at least partly surrounding two matrices each of a plurality of spheres, each matrix when flat having its spheres mounted for rotation in at least part a single plane, the plane of one matrix being parallel to that of the other matrix, each sphere of one matrix in contact with a plurality of spheres of the other matrix so that rotation of a sphere of one matrix results in counter rotation of a plurality of spheres of the other matrix wherein the spheres of each matrix project beyond the frame, wherein a majority of the spheres of one matrix is in contact with four spheres of the other matrix.

11. A bearing according to claim 10 wherein the spheres are between 25 mm and 15 mm in diameter.

12. A bearing according to claim 10 wherein the spheres are between 2.5 and 7.5 mm in diameter.

13. A bearing comprising a frame at least partly surrounding two matrices each of a plurality of spheres, each matrix when flat having its spheres mounted for rotation in at least part a single plane, the plane of one matrix being parallel to that of the other matrix, each sphere of one matrix contiguous with a plurality of spheres of the other matrix so that rotation of a sphere of one matrix results in counter rotation of a plurality of spheres of the other matrix, wherein the spheres are woven into each matrix.

* * * * *